United States Patent
Osborne et al.

[11] 3,773,367
[45] Nov. 20, 1973

[54] FLUID PRESSURE BRAKING SYSTEMS FOR VEHICLES

[75] Inventors: Duncan William Osborne; Leslie Cyril Chouings, both of Leamington Spa, England

[73] Assignee: Automotive Products Company Limited, Leamington Spa, England

[22] Filed: July 20, 1971

[21] Appl. No.: 164,299

[30] Foreign Application Priority Data
Feb. 24, 1971   Great Britain...................... 5,358/71

[52] U.S. Cl. .............................. 303/22 R, 303/6 C
[51] Int. Cl. .............................................. B60t 8/26
[58] Field of Search ............... 303/6 C, 22 A, 22 R, 303/24 A; 188/349

[56] References Cited
UNITED STATES PATENTS

| | | | |
|---|---|---|---|
| 3,232,057 | 2/1966 | Kersting .......................... | 303/6 C X |
| 3,358,445 | 12/1967 | Wallace .......................... | 303/6 C X |
| 3,649,084 | 3/1972 | Stelzer .............................. | 303/22 R |
| 3,671,080 | 6/1972 | Kawaguchi ......................... | 303/6 C |

Primary Examiner—Duane A. Reger
Attorney—Lawrence J. Winter

[57] ABSTRACT

A liquid pressure reducing valve for use in a liquid pressure vehicle braking system to reduce the pressure acting to apply the rear wheel brakes in relation to the pressure available at the pressure source of the braking system under heavy braking comprises a valve closed when a predetermined pressure is built up in the braking system and including a plunger through which pressure is transmitted to rear wheel brake operating motor cylinders when the valve is closed, a spring being provided which opposes the source pressure acting on the plunger and so reduces the pressure exerted by the plunger on liquid in the motor cylinders. The liquid pressure acting to close the valve is opposed by resilient means the load of which is varied in accordance with the load supported by the rear wheels of the vehicle.

4 Claims, 3 Drawing Figures

FLUID PRESSURE BRAKING SYSTEMS FOR VEHICLES

This invention relates to fluid pressure braking systems for vehicles. It is known, in such braking systems to provide means whereby, although the fluid pressure exerted to apply the brakes on a first group of wheels of the vehicle, usually the front wheels, is completely under the control of the driver, a valve is provided which so controls the pressure exerted to apply the brakes on a second group of wheels of the vehicle, usually the rear wheels that, under predetermined conditions, that pressure exerted to apply the brakes on said second group of wheels, is reduced in relation to the pressure acting to apply the brakes on the first group of wheels.

The valve may be controlled by deceleration of the vehicle, the predetermined condition being deceleration in excess of a predetermined rate, or pressure in the braking system and, in the latter case, the driver-controlled pressure at which the valve becomes operative to effect such relative reduction in pressure may be varied automatically in accordance with the load supported by the second group of vehicle wheels.

It is the object of the present invention to provide a valve for the purpose set forth of the kind which is controlled by pressure in the braking system and which may be arranged to operate at a pressure depending on the load supported by the second group of vehicle wheels.

The invention consists in a pressure reducing valve for use in a liquid pressure vehicle braking system to provide a pressure in motor cylinders of said braking system actuating brakes on wheels of the vehicle less than the pressure at a pressure source providing liquid pressure to operate said motor cylinders, said pressure reducing valve comprising a valve body having a valve bore, a first plunger slidable in said valve bore, a second plunger slidable in said valve bore, said second plunger being annular and surrounding said first plunger, an inlet passage opening into said bore on one side of said second plunger, an outlet bore opening into said bore on the other side of said second plunger, passage means in said first plunger providing a connection between opposite sides of said second plunger, a valve closure member on said first plunger co-operating with a seat in the bore to close said passage means, first resilient means acting on said first plunger to urge it in a direction to unseat said valve closure member, and second resilient means acting on said second plunger to oppose thrust exerted thereon by pressure in the inlet passage, the arrangement being such that the pressure in the outlet passage opposes the thrust exerted by the first resilient means on the first plunger and, when said pressure in the outlet passage reaches a predetermined value, moves the first plunger to seat the valve closure member, after which the pressure in the inlet passage acts on the end of the second plunger adjacent that passage to produce a pressure at the outlet passage which is less than the pressure at the inlet passage by an amount depending on the thrust exerted by the second resilient means.

There will now be described by way of example and with reference to the accompanying drawings, one embodiment of a pressure reducing valve according to the invention and the manner of its incorporation in a liquid pressure braking system of a vehicle.

Figure 1:
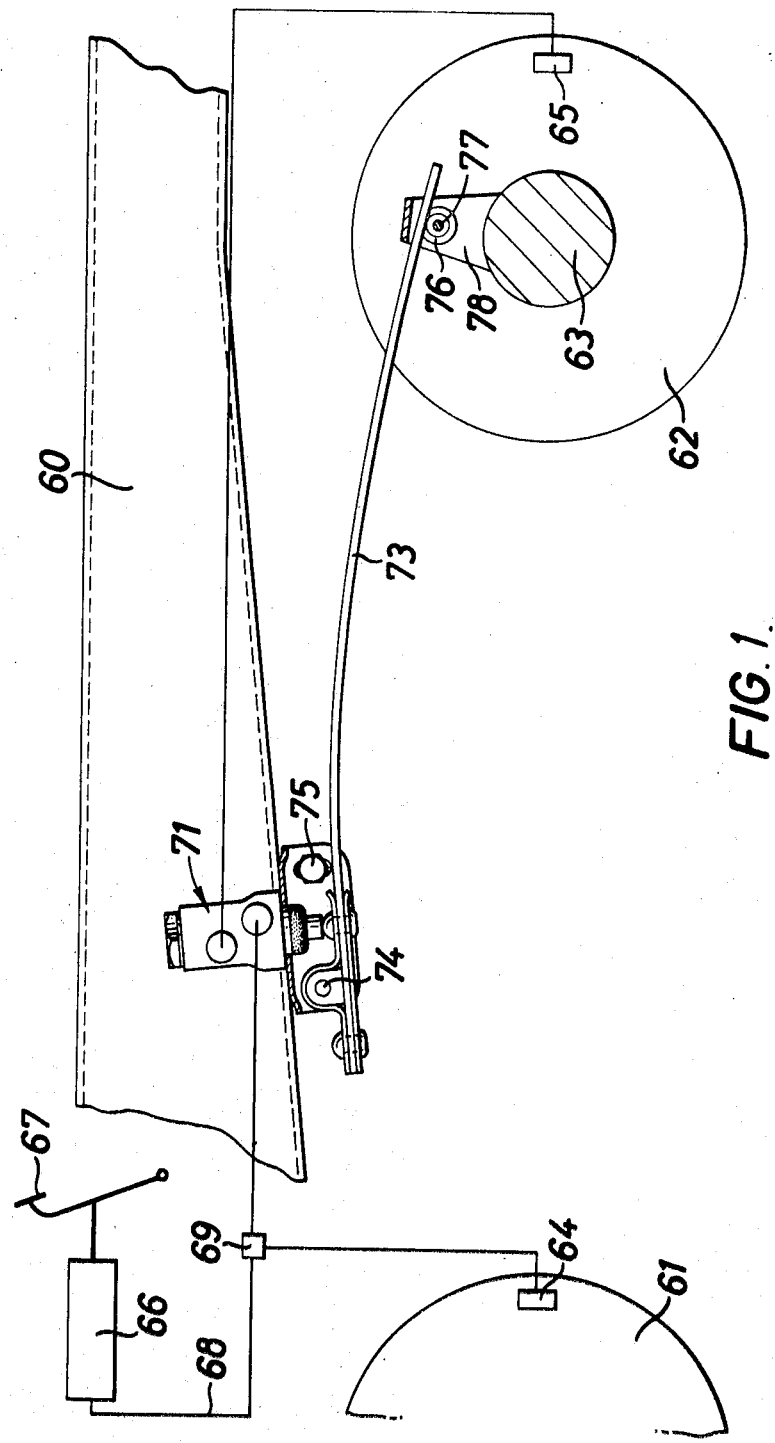
FIG. 1 is a diagrammatic view showing a liquid pressure braking system for a vehicle, some parts of a vehicle on which the said braking system is installed, and a reducing valve incorporated in the said braking system.

Referring to FIG. 1 of the drawings, a part of the frame of a vehicle is shown at 60, a front wheel of the vehicle at 61, and a rear wheel of the vehicle at 62, the rear wheel being one of a pair mounted on an axle 63 coupled to the vehicle frame 60 by the usual suspension springs (not shown). It will be apparent that, depending on the load transmitted to the rear wheels 62 through the suspension springs, the distance between the axle 63 and the frame 60 will vary, the said distance decreasing as the load increases.

Brakes, not shown, on the wheels 61 and 62 and on the corresponding wheels on the other side of the vehicle are operated by liquid pressure motor cylinders, one front brake operating motor cylinder being shown at 64 and one rear brake operating motor cylinder being shown at 65. A liquid pressure master cylinder 66 for creating pressure to apply the brakes is operated by a pedal 67. A conduit 68 leading from the outlet of the master cylinder 66 is branched at 69, one branch leading to the front brake motor cylinders 64 and the other branch leading to the inlet of a liquid pressure reducing valve 71, more fully described hereinafter with reference to FIG. 2.

An outlet from the liquid pressure reducing valve 71 is connected by a conduit 72 to the rear brake operating motor cylinders 65.

The liquid pressure reducing valve 71, as will be hereinafter described, is controlled by a blade spring 73, pivoted adjacent one end thereof at 74 on a bracket 75 carried by the vehicle frame 60, which bracket also supports the reducing valve 71, the other end of the blade spring 73 having mounted thereon an eye 76 engaging a pin 77 carried by a bracket 78 carried by the axle 63.

Figure 2:
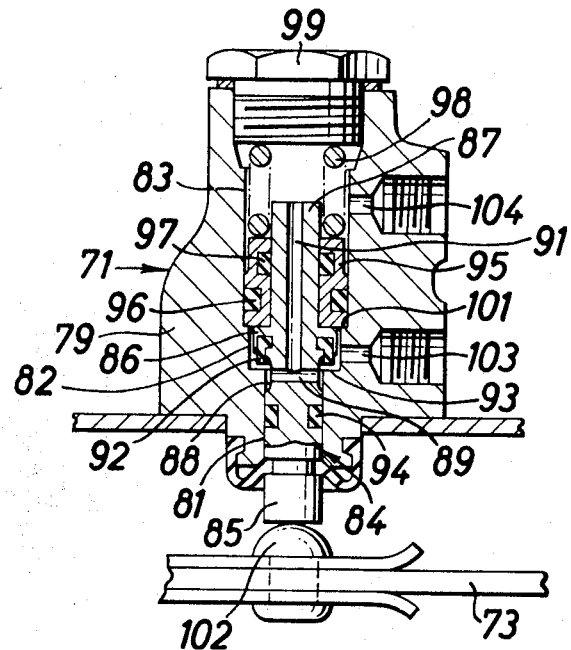
FIG. 2 is a sectional elevation of the reducing valve shown in FIG. 1.

Referring now to FIG. 2 of the drawings, the liquid pressure reducing valve 71 comprises a body 79 formed with a through bore stepped to provide a first bore portion 81 at one end of relatively small diameter, a second intermediate bore portion 82 of somewhat larger diameter, and a third bore portion 83, extending between the intermediate bore portion 82 and the other end of the bore, which third bore portion 83 is of larger diameter than the intermediate bore portion 82.

A first plunger 84 is provided which has a first end portion 85 extending through and slidable in the first bore portion 81, an enlarged intermediate portion 86 of slightly smaller diameter than the intermediate portion 82 of the body bore and, on the other side of said intermediate portion 86, a third portion 87, of smaller diameter than the first end portion 85, which extends into the third portion 83 of the body bore. Adjacent the intermediate portion 86 of the plunger, the first end portion 85 of the plunger is reduced in diameter as shown at 88, and a diametral passage 89 in the plunger, opening into said reduced portion 88, is connected by an axial passage 91 in the plunger to the third portion 83 of the bore.

A sealing ring 92 carried by the intermediate portion 86 of the plunger 84 is adapted to seat on a shoulder 93 between the first and second portions 82 and 83 of the bore to close the passage 89, 91 through the plunger 84, and a packing ring 94 on the first end portion 85 of the plunger engages in the first end portion 81 of the body bore.

A second plunger 95, of annular form, is slidable in the third bore portion 83 and surrounds the third portion 87 of the first plunger 84, packing rings 96 and 97 being provided to prevent leakage of fluid between the said second plunger 95 and the bore wall and between the said second plunger 95 and the first plunger 84, and a coiled compression spring 98, taking its abutment on a screw plug 99 closing the end of the third portion 83 of the body bore, urges the said second plunger 95 towards a shoulder 101 at the junction of the second and third portions 82 and 83 of the body bore.

The blade spring 73 carries a rivet having a rounded head 102 adapted to engage the end portion 85 of the first plunger 84 which projects from the bore portion 81, and provides a force to urge the said plunger 84 towards the end of the body bore closed by the screw plug 99.

A port 103 opening into the intermediate portion 82 of the body bore is adapted to be connected to the liquid pressure master cylinder 66 and a second port 104 opening into the third portion 83 of the body bore between the second plunger 95 and the screw plug 99 is adapted to be connected to the motor cylinders 65 actuating the rear brakes of a vehicle.

Any other source of liquid pressure may be used instead of a master cylinder, such as, for example, a pump with or without liquid pressure storage means, the driver's control being a valve operable to direct pressure liquid from the source to the reducing valve and to the front brake operating motor cylinders.

When the brakes are not being operated, the coiled compression spring 98 holds the second plunger 95 against the shoulder 101 in the body bore and the blade spring 73 holds the intermediate portion 86 of the first plunger 84 against the second plunger 95, so that the sealing ring 92 carried by the first plunger 84 is spaced from the shoulder 103 and the passage 89, 91 through the first plunger 84 is open.

When fluid pressure is generated to apply the brakes, it acts on the end of the first plunger 84 exposed in the third portion 83 of the body bore to oppose the load of the blade spring 73 and, when a pressure sufficient to overcome the blade spring is reached, the said first plunger 84 moves to engage the sealing ring 92 with the shoulder 103 and so close the passage 89, 91 through the first plunger. Thus no further fluid can be passed to the motor cylinders 65 operating the rear brakes, but the source pressure, acting on the second plunger 95, tends to move it against the load of the coiled compression spring 98 to displace fluid from the third portion 83 of the body bore into those motor cylinders. Thus, if the pressure at the pressure source is further increased, the front brakes, being directly connected to the said source, are applied with an increased force directly proportional to the pressure increase, but the increase of application of the rear brakes takes place at a lesser rate, the increase of the source pressure being partly absorbed in compressing the coiled compression spring 98.

The blade spring 73 exerts a force on the first plunger 84 which varies with the load supported by the rear wheels of the vehicle, the said force increasing as the vehicle load increases so that the braking pressure at which the passage 89, 91 through the first plunger 84 is closed and limitation of the effort to apply the rear brakes commences, depends on the load carried by the rear wheels.

Figure 3:
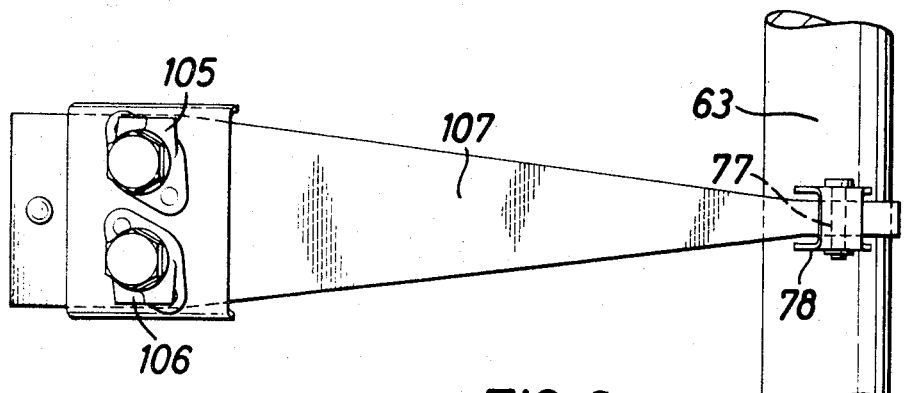
FIG. 3 is a plan view of an arrangement similar to that shown in FIG. 1 but including two reducing valves.

In a fluid pressure braking system in which the brakes of a vehicle, or at least the rear wheel brakes, are applied by liquid pressure from two sources acting in separate motor cylinders or in separate chambers of common motor cylinders, so that the brakes can still be applied if one source of pressure fails or the connection between one source of pressure and the associated motor cylinders is damaged, separate pressure reducing valves are provided between each source of pressure and the associated motor cylinders or motor cylinder chambers. As shown in FIG. 3, pressure reducing valves 105, 106 in the two parts of the system may be controlled by a common blade spring 107 mounted in the same manner as the blade spring 73 shown in FIG. 1, the valves 105 and 106, which are of the same form as the valve 71 shown in FIG. 1, being mounted side-by-side in a single bracket 107 and the blade spring being wide enough to engage the projecting plungers of both valves.

We claim:

1. A pressure reducing valve for use in a liquid pressure vehicle braking system to provide a pressure in motor cylinders of said braking system actuating brakes on wheels of the vehicle less than the pressure at a pressure source providing liquid pressure to operate said motor cylinders, said pressure reducing valve comprising a valve body having a valve bore, a first plunger slidable in said valve bore, a second plunger slidable in said valve bore, said second plunger being annular and surrounding said first plunger, an inlet passage opening into said bore on one side of said second plunger, an outlet bore opening into said bore on the other side of said second plunger, passage means in said first plunger providing a connection between opposite sides of said second plunger, a valve closure member on said first plunger co-operating with a seat in the bore to close said passage means, first resilient means acting on said first plunger to urge it in a direction to unseat said valve closure member, and second resilient means acting on said second plunger to oppose thrust exerted thereon by pressure in the inlet passage, the arrangement being such that the pressure in the outlet passage opposes the thrust exerted by the first resilient means on the first plunger and, when said pressure in the outlet passage reaches a predetermined value, moves the first plunger to seat the valve closure member, after which the pressure in the inlet passage acts on the end of the second plunger adjacent that passage to produce a pressure at the outlet passage which is less than the pressure at the inlet passage by an amount depending on the thrust exerted by the second resilient means.

2. A pressure reducing valve according to claim 1, wherein the valve body is formed with a stepped bore closed at the end thereof having the largest diameter, the first plunger includes a first end portion slidable in and projecting from the other end of the said bore, an intermediate portion of larger diameter than the first end portion and carrying a seating ring co-operating with a seat in the bore, and a second end portion of smaller diameter than said first end portion extending through the annular plunger which is slidable in the largest diameter portion of the valve bore.

3. In a vehicle having a vehicle frame, road wheels, resilient suspension means supporting said road wheels, brakes on said wheels, a liquid pressure braking system for operating said brakes including a source of liquid pressure and motor cylinders to operate said brakes, the provision of a pressure reducing valve as claimed in claim 1 between said pressure source and motor cylinders of the braking system, the said reducing valve being mounted on the vehicle frame and the first resilient means being connected to said road wheels so as to be stressed to an extent which increases with the loading of the vehicle.

4. The combination of claim 3, wherein the said first resilient means comprise a blade spring pivotally mounted at one end on the vehicle frame, the said blade spring engaging the first plunger of the reducing valve adjacent that end and being attached at its other end to an axle carrying the said wheels of the vehicle.

* * * * *